350-427
SR

OR  3,609,005

T4069C

United State [11] 3,609,005

[72] Inventor Souichi Nakamura
  Kamakura-shi, Japan
[21] Appl. No. 870,481
[22] Filed Oct. 1, 1969
[45] Patented Sept. 28, 1971
[73] Assignee Nippon Kogaku K.K.
  Tokyo, Japan
[32] Priority Oct. 8, 1968
[33]  Japan
[31]  43/72886

[54] VARIFOCAL OPTICAL SYSTEM FOR ZOOM LENS HAVING ULTRA-HIGH ZOOM RATIO
3 Claims, 10 Drawing Figs.
[52] U.S. Cl..................................... 350/184,
  350/214
[51] Int. Cl..................................... G02b 15/14
[50] Field of Search........................... 350/184,
  186

[56] References Cited
UNITED STATES PATENTS
3,045,546 7/1962 Cook........................... 350/186
3,507,555 4/1970 Isshiki......................... 350/184
FOREIGN PATENTS
1,095,539 12/1967 Great Britain................ 350/184
Primary Examiner—John K. Corbin
Attorney—Ward, McElhannon, Brooks & Fitzpatrick

ABSTRACT: Varifocal optical system for zoom lens of this invention attains a zoom ratio larger than 20 and consists of convergent, divergent and convergent lens groups. The second group is movable over a wide range and the third group is moved in the direction opposite to that of the second group so as to constitute the zoom operation maintaining the position of image surface constant.

— SPHERICAL ABERRATION
--- SINE CONDITION

FIG. 2B

ASTIGMATISM — SAGITAL
--- MERIDIONAL

FIG. 2C

CHROMATIC ABERRATION OF MAGNIFICATION

---- g-Line
—— c-Line

FIG. 2D

DISTORTION

FIRST LENS — SECOND LENS — THIRD LENS — RELAY LENS

FIG. 4A

— SPHERICAL ABERRATION
--- SINE CONDITION

FIG. 4B

ASTIGMATISM — SAGITAL
--- MERIDIONAL

FIG. 4C

CHROMATIC ABERRATION OF MAGNIFICATION

---- g-Line
—— c-Line

FIG. 4D

DISTORTION

VARIFOCAL OPTICAL SYSTEM FOR ZOOM LENS HAVING ULTRA-HIGH ZOOM RATIO

The present invention relates to a varifocal optical system for zoom lens having a zoom ratio larger than 20 and of the type in which the varifocal optical system comprises of three convergent, divergent and convergent lens groups so that the second lens group is moved over a wide range for zooming while the third lens group is moved in the direction opposite to that of the second lens group, thereby maintaining the position of the image surface constant over the whole field. (The term "variable focal optical system" is used in this specification to designate the optical system consisting of a lens group mainly for focusing, a group mainly for varying the focal length and a lens group mainly for maintaining constant the image surface of the zoom lens so as to be distinguished from the relay lens system following the varifocal optical system).

In case of a zoom lens having a high zoom ratio the following problems arise;

1. The chromatic aberration at the longer focal length must be corrected;
2. The high-order spherical aberrations over the range from the focal length in the vicinity of (minimum focal length X $\sqrt{\text{zoom ratio}}$) to the longer focal length must be balanced while the chromatic or color variation caused by this balancing must be corrected;
3. The coma at the longer focal length must be corrected by suitably balancing the fulfillment of the sine conditions; and
4. The aberrations due to the movement over a long range of the first lens group (focusing lens group) for photographing a short-distance object must be stabilized.

In view of the above, the present invention has for its primary object to provide a varifocal optical system for a zoom lens system having an ultra-high-zoom ratio and excellent performance and being capable of eliminating substantially all the problems encountered in the conventional zoom lens system without varying the aperture over the whole zooming range.

The present invention will be described more in detail referring to the illustrative examples shown in the attached drawing, in which:

FIGS. 2 A, B, C and D show respective aberrations of the system of the first example at the shortest, intermediate 1, intermediate 2 and the longest focal lengths respectively;

FIGS. 4 A, B, C and D show respective aberrations of the second example at the shortest, intermediate 1, intermediate 2 and the longest focal lengths, respectively.

The varifocal optical system of the present invention comprises a first convergent lens group a second divergent lens group and a third convergent lens group, said second lens group being moved over a relatively wide range thereby accomplishing zooming while said third lens group is moved in the direction opposite to that of the second lens group, thereby maintaining constant the image surface.

Furthermore, according to the present invention the following relations should be satisfied:

$$-1.5 < \frac{R_1+R_3}{R_1-R_3} < 0 \tag{I}$$

$$0.8 < \frac{R_9+R_{10}}{R_9-R_{10}} < 5.0 \tag{II}$$

$$1.2 < \frac{f_{2ab}}{f_2} < 1.5 \text{ and } 2.0 < \frac{f_{2a}}{f_{2ab}} < 6.0 \tag{III}$$

$$\begin{array}{l} 0.7 < -R/f_3 < 1.0 \text{ (a)} \\ 0.8 < nf/nr < 1.0 \text{ (b)} \end{array} \tag{IV}$$

where $R_1$ and $R_3$ = radii or curvature of front and rear free surfaces of the cemented lens of the first component of the first lens group; $R_9$ and $R_{10}$ = radii of curvature of front and rear surfaces of the first lens component of the second lens group: $f_2$ = the compound focal length of the second lens group; $f_{2ab}$ = the compound focal length of the second lens group except the last cemented lens; $f_{2a}$ = the focal length of the first component of the second group $f_3$ = the component focal length of the third lens group; R = the radius of curvature of the cemented interface of the last cemented lens of the third lens group, and $nf$ and $nr$ = indexes of the convex and concave lenses which compose the last cemented lens of the third lens group.

Next the significance of the above-described conditions will be described in more detail.

When the value of the condition $(R_1+R_3)(R_1-R_3)$ is larger than zero, not only the curvature of the image surface but also other aberration may be balanced at the infinity distance position at both of the minimum and maximum focal lengths, however, when an object is located at a relatively shorter distance, i.e., 5 to 10 times the maximum focal length of the zoom lens, the curvature of the focal plane spherical aberrations and other aberrations on the longer focal length side are unbalanced so that the performance of the zoom lens is deteriorated. On the other hand, when the value is less than -- 1.5, it is difficult to balance the aberrations with each other at the infinity distance position. Especially the convergent bending toward the object becomes larger so the selection of types of glasses for balancing the achromatic feature of the whole first lens group will become impossible. Thus, it is impossible to manufacture such first lens group.

The conditions (II) and (III) are for minimizing the color variation of the spherical aberration due to the variations of high-order spherical aberrations and the increased coma caused by the unbalance of the sine conditions from the intermediate to the maximum focal lengths, which are very difficult to be solved satisfactorily in case of the zoom lens having an ultra-high zoom ratio.

When the ratio of the condition (III) is in excess of the upper limit, the spherical aberration of the helium $d$ line is overcorrected so that the color or chromatic variation of the spherical aberrations by the light rays whose wavelengths are shorter than the helium $d$ line will be much increased. On the other hand, when the ratio is less than the lower limit, the color or chromatic variation of the spherical aberrations due to the undercorrected, spherical aberrations at the maximum focal length will be increased.

The condition (II) will be investigated under the assumption that the condition (III) is satisfied. When the ratio $(R_9+R_{10})(R_9-R_{10})$ is larger than 5, the sine condition will become too much negative on the maximum focal length side so that the coma will be increased. On the other hand, when the ratio is less than 0.8, the sine condition will become too much positive so that the coma aberration will be also increased. Therefore, the aperture ratio on the longer focal length side must be reduced. The last cemented lens of the second lens group which satisfies the conditions (II) and (III) is for obtaining suitable combinations of the types of the glasses for carrying out the suitable correction of chromatic aberrations imposed upon the second lens group as a whole, thereby attaining a suitable balance of aberrations.

The condition (b) of (IV) must be satisfied in order to improve the color of chromatic variation of the spherical aberration due to the variations of the high-order spherical aberrations from the intermediate focal length to the longer focal length. When both of the conditions (a) and (b) of (IV) are satisfied, various aberrations may be suitably balanced and especially the coma are satisfactorily corrected all over the magnification range. That is, when the value of $-R/f_3$ is less than 0.7, the coma at the intermediate focal length will be increased so that the aberrations may not be well-balanced all over the magnification range. On the other hand, when the value is in excess of 1.0, the spherical aberration at the maximum focal length is undercorrected so that it will be very difficult to maintain constant the aperture ratio over the whole magnification range.

After the verifocal optical system satisfying the above-described conditions is obtained, the Petzval sum of the relay lens system following the varifocal optical system may be suitably corrected in consideration of the ratio of the range of the variation of the focal length of the varifocal optical system to the compound focal length of the total zoom lens system, whereby the high performance zoom lens may be provided in a relatively simple manner.

Next some examples of the present invention will be described.

Figure 1:
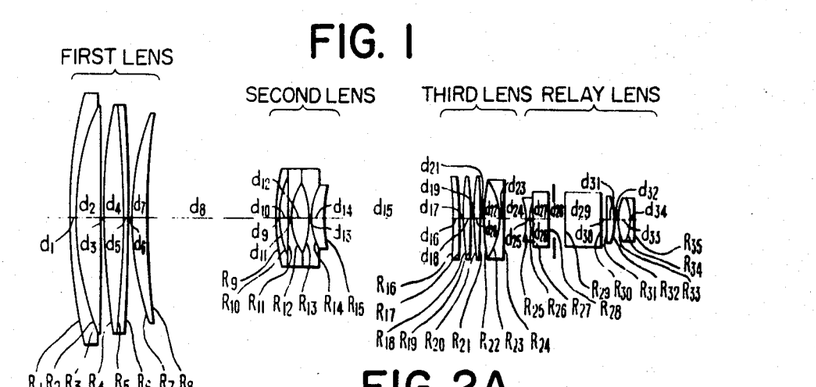
FIG. 1 shows a cross section of a first example of an 8 mm. cine photographic lens (for super 8) embodying the optical system of this invention.
Figure 2A:
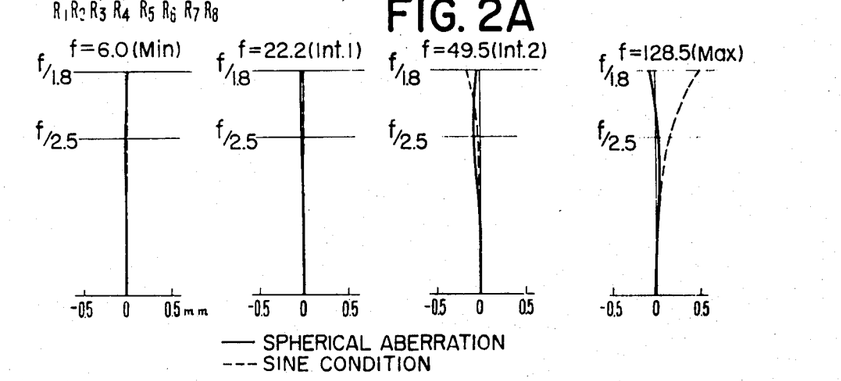
Figure 2B:
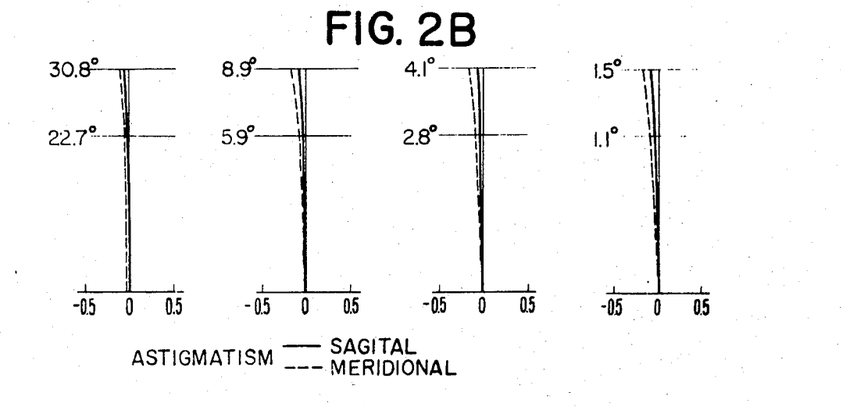
Figure 2C:
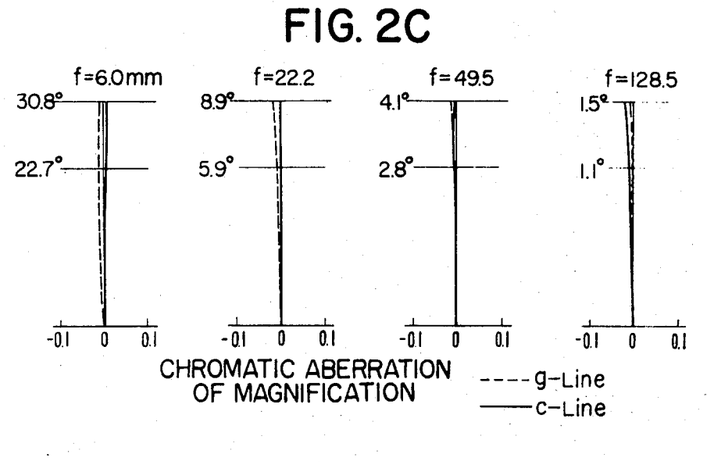
Figure 2D:
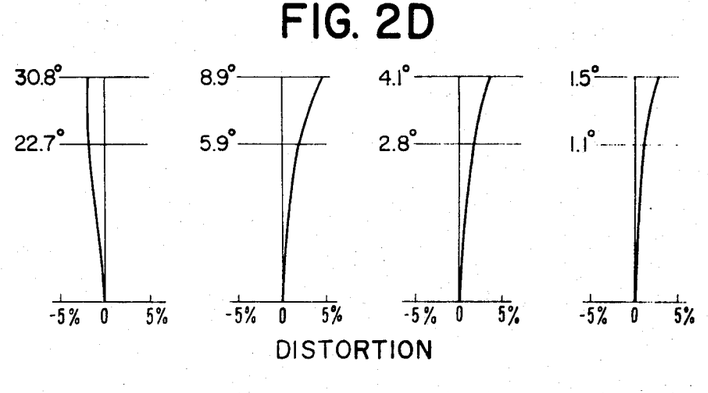

FIG. 1 is a diagrammatic sectional view of 8 mm. cine photographic zoom lens to which is applied the present invention. When the aperture ratio is F:1.8 and the focal length, $f=6.0$ to 128.5, the design data of the lens system are as follows:

| | | | |
|---|---|---|---|
| $R_1=198.000$ | $d_1=1.9$ | $n_1=1.74$ | $vd_1=28.2$ |
| $R_2=115.617$ | $d_2=9.0$ | $n_2=1.51728$ | $vd_2=69.6$ |
| $R_3=2,025.800$ | $d_3=0.1$ | | |
| $R_4=250.898$ | $d_4=7.7$ | $n_3=1.51728$ | $vd_3=69.6$ |
| $R_5=-250.898$ | $d_5=1.9$ | $n_4=1.74$ | $vd_4=28.2$ |
| $R_6=-582.377$ | $d_6=0.1$ | | |
| $R_7=93.500$ | $d_7=6.1$ | $n_5=1.5168$ | $vd_5=64.2$ |
| $R_8=260.459$ | $d_8=0.468$ | 80.633 | |
| $R_9=85.74$ | $d_9=1.1$ | $n_6=1.744$ | $vd_6=44.9$ |
| $R_{10}=45.562$ | $d_{10}=3.1$ | | |
| $R_{11}=790.330$ | $d_{11}=1.1$ | $n_7=1.6968$ | $vd_7=55.6$ |
| $R_{12}=21.493$ | $d_{12}=7.7$ | | |
| $R_{13}=-53.850$ | $d_{13}=0.85$ | $n_8=1.5168$ | $vd_8=64.2$ |
| $R_{14}=23.4$ | $d_{14}=5.1$ | $n_9=1.80518$ | $vd_9=25.5$ |
| $R_{15}=71.697$ | $d_{15}=102.888$ | 2.731 | |
| $R_{16}=-1,229.864$ | $d_{16}=3.1$ | $n_{10}=1.62280$ | $vd_{10}=56.9$ |
| $R_{17}=-167.880$ | $d_{17}=0.1$ | | |
| $R_{18}=70.667$ | $d_{18}=3.5$ | $n_{11}=1.62041$ | $vd_{11}=60.8$ |
| $R_{19}=-154.32$ | $d_{19}=0.1$ | | |
| $R_{20}=73.650$ | $d_{20}=3.5$ | $n_{12}=1.62041$ | $vd_{12}=60.3$ |
| $R_{21}=-141.330$ | $d_{21}=0.1$ | | |
| $R_{22}=62.2$ | $d_{22}=7.3$ | $n_{13}=1.67790$ | $vd_{13}=55.5$ |
| $R_{23}=-23.854$ | $d_{23}=1.0$ | $n_{14}=1.740$ | $vd_{14}=28.2$ |
| $R_{24}=-655.518$ | $d_{24}=2.148$ | 22.135 | |
| $R_{25}=-33.884$ | $d_{25}=0.7$ | $n_{15}=1.5168$ | $vd_{15}=64.2$ |
| $R_{26}=23.9$ | $d_{26}=1.2$ | | |
| $R_{27}=\infty$ | $d_{27}=7.0$ | $n_{16}=1.57501$ | $vd_{16}=41.3$ |
| $R_{28}=\infty$ | $d_{28}=5.8$ | | |
| $R_{29}=\infty$ | $d_{29}=13.9$ | $n_{17}=1.57501$ | $vd_{17}=41.3$ |
| $R_{30}=\infty$ | $d_{30}=1.3$ | | |
| $R_{31}=99.5$ | $d_{31}=2.9$ | $n_{18}=1.53172$ | $vd_{18}=48.9$ |
| $R_{32}=-21.336$ | $d_{32}=0.2$ | | |
| $R_{33}=26.71$ | $d_{33}=5.3$ | $n_{19}=1.60717$ | $vd_{19}=40.2$ |
| $R_{34}=16.559$ | $d_{34}=1.2$ | $n_{20}=1.86074$ | $vd_{20}=23.1$ |
| $R_{35}=-175.330$ | | | | where $R$ = radius of curvature $d$ = thickness of center of lens element and spacing between two adjacent lenses.

$n$ = index of refraction of used glass at $d$ line, and $v_d$ = Abbe number of glass used.

In this example, the relay lens group had a simple construction consisting of a simple divergent lens, a simple convex lens and a doublet. However, when required, the simple convergent lens and the doublet may be replaced with any other complex optical system such as a triplet. The two prisms interposed in this optical system are for directing the light rays to a finder and for measuring the luminous intensity of the subject and constitute no essential part of the present invention.

Figure 3:
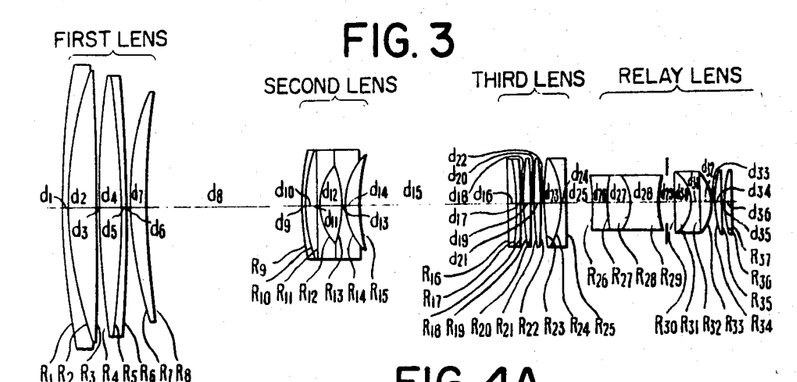
FIG. 3 shows a cross section of a second example of photographic lens for an industrial television camera embodying the optical system of the present invention.
Figure 4A:
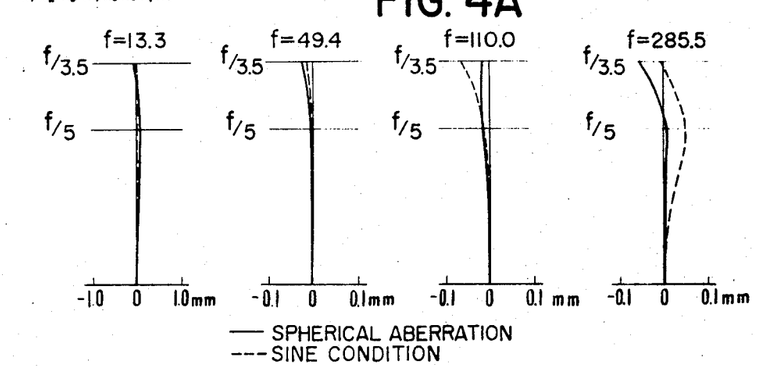
Figure 4B:
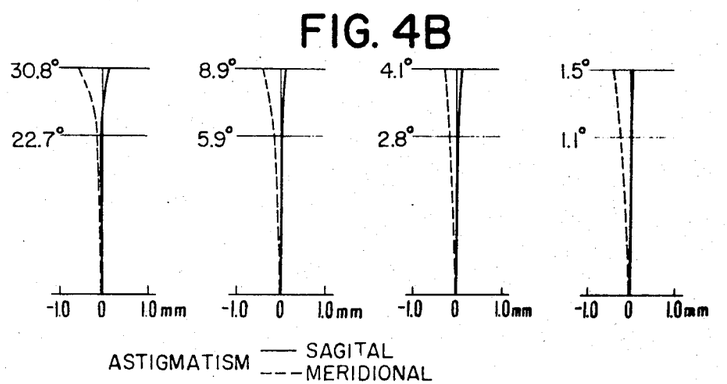
Figure 4C:
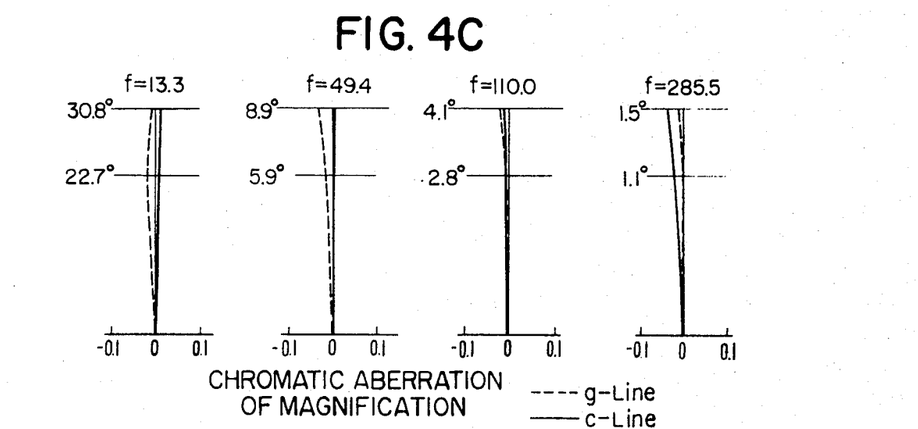
Figure 4D:
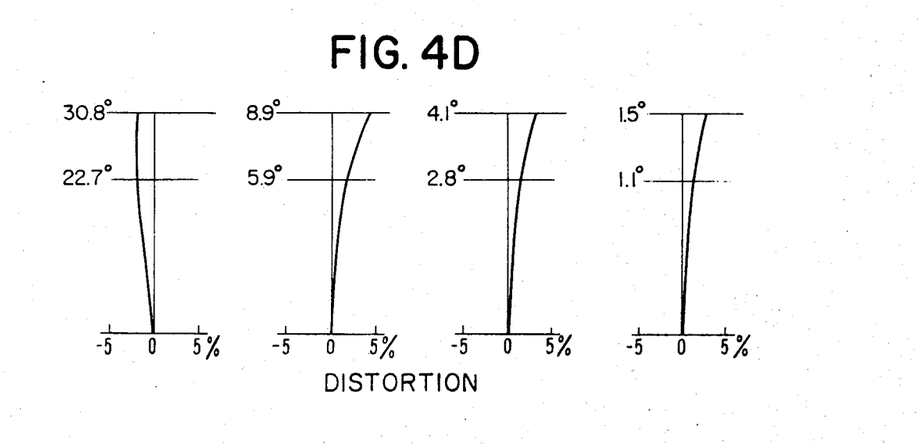

FIG. 2 shows the aberration curves of the first example at the minimum focal length, $f=6.0$; the first intermediate focal length, $f=22.2$; the second intermediate focal length, $f=49.5$; and the maximum focal length of, $f=128.5$. It will be seen that the aberrations are well corrected over the whole zooming range. FIG. 3 shows the second embodiment of the present invention applied to the industrial television camera zoom lens. The aperture ratio was F 3.5; and the focal length, $f=13.5$ to 285.5. The design date are as follows:

| | | | |
|---|---|---|---|
| $R_1=231.320$ | $d_1=2.2$ | $n_1=1.74$ | $vd_1=28.2$ |
| $R_2=135.000$ | $d_2=10.5$ | $n_2=1.51728$ | $vd_2=69.6$ |
| $R_3=2,366.200$ | $d_3=0.1$ | | |
| $R_4=292.56$ | $d_4=9.0$ | $n_3=1.51728$ | $vd_3=69.6$ |
| $R_5=-292.56$ | $d_5=2.2$ | $n_4=1.74$ | $vd_4=28.2$ |
| $R_6=-679.022$ | $d_6=0.1$ | | |
| $R_7=107.000$ | $d_7=7.0$ | $n_5=1.51835$ | $vd_5=60.3$ |
| $R_8=286.342$ | $d_8=0.867$ | 94.392 | |
| $R_9=100.000$ | $d_9=1.0$ | $n_6=1.744$ | $vd_6=44.9$ |
| $R_{10}=53.150$ | $d_{10}=3.6$ | | |
| $R_{11}=920.850$ | $d_{11}=1.2$ | $n_7=1.69680$ | $vd_7=55.6$ |
| $R_{12}=25.120$ | $d_{12}=9.0$ | | |
| $R_{13}=-60.240$ | $d_{13}=0.8$ | $n_8=1.5168$ | $vd_8=64.2$ |
| $R_{14}=27.300$ | $d_{14}=6.0$ | $n_9=1.80518$ | $vd_9=25.5$ |
| $R_{15}=86.718$ | $d_{15}=119.549$ | 2.699 | |
| $R_{16}=-1,437.113$ | $d_{16}=4.0$ | $n_{10}=1.62041$ | $vd_{10}=60.3$ |
| $R_{17}=-70.000$ | $d_{17}=1.0$ | $n_{11}=1.62004$ | $vd_{11}=36.3$ |
| $R_{18}=-194.57$ | $d_{18}=0.1$ | | |
| $R_{19}=82.460$ | $d_{19}=3.7$ | $n_{12}=1.62041$ | $vd_{12}=60.3$ |
| $R_{20}=-179.709$ | $d_{20}=0.1$ | | |
| $R_{21}=82.460$ | $d_{21}=3.7$ | $n_{13}=1.62041$ | $vd_{13}=60.3$ |
| $R_{22}=-179.709$ | $d_{22}=0.1$ | | |
| $R_{23}=72.567$ | $d_{23}=7.9$ | $n_{14}=1.6779$ | $vd_{14}=55.5$ |
| $R_{24}=-27.86$ | $d_{24}=1.1$ | $n_{15}=1.74$ | $vd_{15}=28.2$ |
| $R_{25}=-932.114$ | $d_{25}=3.601$ | 26.953 | |
| $R_{26}=-49.86$ | $d_{26}=5.0$ | $n_{16}=1.70154$ | $vd_{16}=41.1$ |
| $R_{27}=60.0$ | $d_{27}=11.0$ | $n_{17}=1.69895$ | $vd_{17}=30.0$ |
| $R_{28}=-12.5$ | $d_{28}=9.6$ | $n_{18}=1.61484$ | $vd_{18}=51.1$ |
| $R_{29}=15.8$ | $d_{29}=6.0$ | | |
| $R_{30}=952.432$ | $d_{30}=6.25$ | $n_{19}=1.44628$ | $vd_{19}=67.2$ |
| $R_{31}=-12.87$ | $d_{31}=3.9$ | $n_{20}=1.87$ | $vd_{20}=34.0$ |
| $R_{32}=-144.080$ | $d_{32}=4.6$ | $n_{21}=1.44628$ | $vd_{21}=67.2$ |
| $R_{33}=-15.54$ | $d_{33}=0.05$ | | |
| $R_{34}=37.0$ | $d_{34}=2.8$ | $n_{22}=1.51118$ | $vd_{22}=50.9$ |
| $R_{35}=-1,360.0$ | $d_{35}=0.05$ | | |
| $R_{36}=50.32$ | $d_{36}=2.8$ | $n_{23}=1.51454$ | $vd_{23}=54.6$ |
| $R_{37}=242.918$ | | | | where $R$ = radius of curvature $d$ = thickness of center of lens and spacing between two adjacent lenses, $n$ = index of refraction of glass used on $d$ line $vd$ = Abbe number of glass used.

In this example, the relay lens group consists of a divergent lens group and a convergent lens group, and the focal length of each group of the varifocal optical system was made shorter in order to provide the zoom lens compact in size. Therefore, in order to prevent the Petzval sum of the total system from becoming negative, the indexes of refraction of the divergent elements of the convergent lens group of the relay lens group are increased while those of the convex elements decreased, so that the overall balance was attained.

FIG. 4 shows the aberration curves of the second example at the minimum focal length, $f=13.5$; the first intermediate focal length, $f = 49.4$; the second intermediate focal length, $f = 110.0$; and the maximum focal length, $f = 285.5$. It will be seen that the aberration are well corrected over the whole zooming range.

From the foregoing, it will be clear that various zoom lens systems having ultra-high zoom ratios and being well corrected over the whole zooming range may be provided when the above described conditions (I) to (IV) are satisfied so that they may be more advantageously used in various fields.

What is claimed is:

1. A varifocal optical system for zoom lens systems located in front of a rear convergent optical system and having an ultra high zoom ratio comprising;

A first convergent stational lens group consisting of a first positive meniscus doublet of which the front and rear surfaces and the cemented surfaces are convex toward the object, a second biconvex doublet provided behind said first doublet, the cemented surfaces of said second doublet being concave toward the object, and a third positive meniscus simple component placed behind said second doublet, the surfaces of said third component being convex toward the object;

A second divergent moveable lens group consisting of first and second negative meniscus simple components of which the surfaces are convex toward the object, and a third biconcave doublet placed behind said second meniscus component, the cemented surfaces of said third doublet being convex toward the object; an A third convergent moveable lens group consisting of a first positive meniscus component of which the front surface is concave toward the object, second and third biconvex simple components placed behind said first positive meniscus component, and a fourth biconvex doublet placed behind said third biconvex component, the cemented surfaces of said fourth doublet being concave toward the object, whereby said second lens group is moved over a wide range for affecting zooming operation, while the third lens group is moved in the direction opposite to that of said second lens group for maintaining the position of the image surface constant.

2. An optical system comprising a first lens group, a second lens group, a third lens group and a relay lens group and a relay lens group and satisfying the following data:

| | | | |
|---|---|---|---|
| $R_1 = 198.000$ | $d_1 = 1.9$ | $n_1 = 1.74$ | $vd_1 = 28.2$ |
| $R_2 = 115.617$ | $d_2 = 9.0$ | $n_2 = 1.51728$ | $vd_2 = 69.6$ |
| $R_3 = 2,025.800$ | $d_3 = 0.1$ | | |
| $R_4 = 250.898$ | $d_4 = 7.7$ | $n_3 = 1.51728$ | $vd_3 = 69.6$ |
| $R_5 = -250.898$ | $d_5 = 1.9$ | $n_4 = 1.74$ | $vd_4 = 28.2$ |
| $R_6 = -582.377$ | $d_6 = 0.1$ | | |
| $R_7 = 93.500$ | $d_7 = 6.1$ | $n_5 = 1.5168$ | $vd_5 = 64.2$ |
| $R_8 = 260.459$ | $d_8 = 0.468$ | 80.633 | |
| $R_9 = 85.74$ | $d_9 = 1.1$ | $n_6 = 1.744$ | $vd_6 = 44.9$ |
| $R_{10} = 45.562$ | $d_{10} = 3.1$ | | |
| $R_{11} = 790.330$ | $d_{11} = 1.1$ | $n_7 = 1.6968$ | $vd_7 = 55.6$ |
| $R_{12} = 21.493$ | $d_{12} = 7.7$ | | |
| $R_{13} = -53.850$ | $d_{13} = 0.85$ | $n_8 = 1.5168$ | $vd_8 = 64.2$ |
| $R_{14} = 23.4$ | $d_{14} = 5.1$ | $n_9 = 1.80518$ | $vd_9 = 25.5$ |
| $R_{15} = 71.697$ | $d_{15} = 102.888$ | 2.731 | |
| $R_{16} = -1,220.304$ | $d_{16} = 3.1$ | $n_{10} = 1.62280$ | $vd_{10} = 56.9$ |
| $R_{17} = 107.880$ | $d_{17} = 0.1$ | | |
| $R_{18} = 70.067$ | $d_{18} = 3.5$ | $n_{11} = 1.62041$ | $vd_{11} = 60.3$ |
| $R_{19} = -154.32$ | $d_{19} = 0.1$ | | |
| $R_{20} = 73.050$ | $d_{20} = 3.5$ | $n_{12} = 1.62041$ | $vd_{12} = 60.3$ |
| $R_{21} = -141.330$ | $d_{21} = 0.1$ | | |
| $R_{22} = 62.2$ | $d_{22} = 7.3$ | $n_{13} = 1.67790$ | $vd_{13} = 55.5$ |
| $R_{23} = -23.854$ | $d_{23} = 1.0$ | $n_{14} = 1.740$ | $vd_{14} = 28.2$ |
| $R_{24} = -655.518$ | $d_{24} = 2.143$ | 22.135 | |
| $R_{25} = -33.884$ | $d_{25} = 0.7$ | $n_{15} = 1.5168$ | $vd_{15} = 64.2$ |
| $R_{26} = 23.9$ | $d_{26} = 1.2$ | | |
| $R_{27} = \infty$ | $d_{27} = 7.0$ | $n_{16} = 1.57501$ | $vd_{16} = 41.3$ |
| $R_{28} = \infty$ | $d_{28} = 5.8$ | | |
| $R_{29} = \infty$ | $d_{29} = 13.9$ | $n_{17} = 1.57501$ | $vd_{17} = 41.3$ |
| $R_{30} = \infty$ | $d_{30} = 1.3$ | | |
| $R_{31} = 99.5$ | $d_{31} = 2.9$ | $n_{18} = 1.53172$ | $vd_{18} = 48.9$ |
| $R_{32} = -21.336$ | $d_{32} = 0.2$ | | |
| $R_{33} = 26.71$ | $d_{33} = 5.3$ | $n_{19} = 1.60717$ | $vd_{19} = 40.2$ |
| $R_{34} = -16.559$ | $d_{34} = 1.2$ | $n_{20} = 1.86074$ | $vd_{20} = 23.1$ |
| $R_{35} = -175.330$ | | | | where $R$ denotes radius of curvature, $d$ denotes a central thickness of lens or spacing between adjacent lenses, $n$ denotes a refractive index on $d$-line of the glass used and $v_d$ denotes Abbe number of the glass used.

3. An optical system comprising a first lens group, a second lens group, a third lens group and a relay lens group and satisfying the following data:

| | | | |
|---|---|---|---|
| $R_1 = 231.320$ | $d_1 = 2.2$ | $n_1 = 1.74$ | $vd_1 = 28.2$ |
| $R_2 = 135.000$ | $d_2 = 10.5$ | $n_2 = 1.51728$ | $vd_2 = 69.6$ |
| $R_3 = 2,366.200$ | $d_3 = 0.1$ | | |
| $R_4 = 292.56$ | $d_4 = 9.0$ | $n_3 = 1.51728$ | $vd_3 = 69.6$ |
| $R_5 = -292.56$ | $d_5 = 2.2$ | $n_4 = 1.74$ | $vd_4 = 28.2$ |
| $R_6 = -679.022$ | $d_6 = 0.1$ | | |
| $R_7 = 107.000$ | $d_7 = 7.0$ | $n_5 = 1.51835$ | $vd_5 = 60.3$ |
| $R_8 = 286.42$ | $d_8 = 0.867$ | 94.392 | |
| $R_9 = 100.00$ | $d_9 = 1.0$ | $n_6 = 1.744$ | $vd_6 = 44.9$ |
| $R_{10} = 53.150$ | $d_{10} = 3.6$ | | |
| $R_{11} = 920.850$ | $d_{11} = 1.2$ | $n_7 = 1.69680$ | $vd_7 = 55.6$ |
| $R_{12} = 25.120$ | $d_{12} = 9.0$ | | |
| $R_{13} = -60.240$ | $d_{13} = 0.8$ | $n_8 = 1.5168$ | $vd_8 = 62.4$ |
| $R_{14} = 27.300$ | $d_{14} = 6.0$ | $n_9 = 1.80518$ | $vd_9 = 25.5$ |
| $R_{15} = 86.718$ | $d_{15} = 119.549$ | 2.699 | |
| $R_{16} = -1,437.113$ | $d_{16} = 4.0$ | $n_{10} = 1.62041$ | $vd_{10} = 60.8$ |
| $R_{17} = -70.000$ | $d_{17} = 1.0$ | $n_{11} = 1.62004$ | $vd_{11} = 36.3$ |
| $R_{18} = -194.57$ | $d_{18} = 0.1$ | | |
| $R_{19} = 82.460$ | $d_{19} = 3.7$ | $n_{12} = 1.62041$ | $vd_{12} = 60.3$ |
| $R_{20} = -179.709$ | $d_{20} = 0.1$ | | |
| $R_{21} = 82.460$ | $d_{21} = 3.7$ | $n_{13} = 1.62041$ | $vd_{13} = 60.3$ |
| $R_{22} = -179.709$ | $d_{22} = 0.1$ | | |
| $R_{23} = 72.567$ | $d_{23} = 7.9$ | $n_{14} = 1.6779$ | $vd_{14} = 55.5$ |
| $R_{24} = -27.86$ | $d_{24} = 1.1$ | $n_{15} = 1.74$ | $vd_{15} = 28.2$ |
| $R_{25} = -932.114$ | $d_{25} = 3.601$ | 26.953 | |
| $R_{26} = -49.86$ | $d_{26} = 5.0$ | $n_{16} = 1.70154$ | $vd_{16} = 41.1$ |
| $R_{27} = 60.0$ | $d_{27} = 11.0$ | $n_{17} = 1.69895$ | $vd_{17} = 30.0$ |
| $R_{28} = -12.5$ | $d_{28} = 9.6$ | $n_{18} = 1.61484$ | $vd_{18} = 51.1$ |
| $R_{29} = 15.8$ | $d_{29} = 6.0$ | | |
| $R_{30} = 952.432$ | $d_{30} = 6.25$ | $n_{19} = 1.44628$ | $vd_{19} = 67.2$ |
| $R_{31} = -12.87$ | $d_{31} = 3.9$ | $n_{20} = 1.87$ | $vd_{20} = 34.0$ |
| $R_{32} = -144.080$ | $d_{32} = 4.6$ | $n_{21} = 1.44628$ | $vd_{21} = 67.2$ |
| $R_{33} = -15.54$ | $d_{33} = 0.05$ | | |
| $R_{34} = 37.0$ | $d_{34} = 2.8$ | $n_{22} = 1.51118$ | $vd_{22} = 50.9$ |
| $R_{35} = -1,360.0$ | $d_{35} = 0.05$ | | |
| $R_{36} = 50.32$ | $d_{36} = 2.8$ | $n_{23} = 1.51454$ | $vd_{23} = 54.6$ |
| $R_{37} = 242.918$ | | | | where $R$ denotes radius of curvature, $d$ denotes a central thickness of lens or spacing between adjacent lenses, $n$ denotes a refractive index on $d$-line of the glass used and $v_d$ denotes Abbe number of the glass used.

UNITED STATES PATENT OFFICE
CERTIFICATE OF CORRECTION

Patent No. 3,609,005          Dated September 28, 1971

Inventor(s) Souichi Nakamura

It is certified that error appears in the above-identified patent and that said Letters Patent are hereby corrected as shown below:

Column 1, line 3, delete "of";
line 58, after "surface." add

--The first lens group comprises a first positive meniscus doublet of which the front and rear surfaces and the cemented surfaces are convex toward the object, a second bi-convex doublet provided behind said first doublet, the cemented surfaces of said second doublet being concave toward the object, and a third positive meniscus simple component placed behind said second doublet, the surfaces of said third component being convex toward the object.

The second lens group comprises first and second negative meniscus simple components of which the surfaces are convex toward the object, and a third bi-concave doublet placed behind said second meniscus component, the cemented surfaces of said third doublet being convex toward the object.

The third lens group comprises a first positive meniscus component of which the front surface is concave toward the object, second and third bi-convex simple components placed behind said first positive meniscus component, and a fourth bi-convex doublet placed behind said third bi-convex component, the cemented surfaces of said fourth doublet being concave toward the object.-- line 74, change "or" to --of--. Column 2, line 14, change "$(R_1 + R_3)(R_1 - R_3)$" to --$(R_1 + R_3/R_1 - R_3)$--; lines 48 and 49, change "$(R_9 + R_{10})(R_9 - R_{10})$" to --$(R_9 + R_{10}/R_9 - R_{10})$--;

UNITED STATES PATENT OFFICE
CERTIFICATE OF CORRECTION

Patent No. 3,609,005  Dated September 28, 1971

Inventor(s) Souichi Nakamura

It is certified that error appears in the above-identified patent and that said Letters Patent are hereby corrected as shown below:

Continued Page 2:

Column 2, line 62, change "of" (first occurrence) to --on--. Column 3, line 1, change "verifocal" to --varifocal-- line 36, change "$d_{15}=102.888$  2.731" to --$d_{15}=102.888 \sim 2.731$--;

line 49, change "$d_{24}=2.148$  22.135" to --$d_{24}=2.148 \sim 22.135$--. Column 4, line 30, change "$d_{15}=110.549$  2.699" to --$d_{15}=119.549 \sim 2.699$--; line 44, change "$d_{25}=3.601$  26.953" to --$d_{25}=3.601 \sim 26.953$--. Column 5, line 28, change "an" to --and--. Column 6, line 40, change "$vd_8=62.4$" to --$vd_8=64.2$--.

Signed and sealed this 27th day of June 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,609,005          Dated September 28, 1971

Inventor(s) Souichi Nakamura

It is certified that error appears in the above-identified patent and that said Letters Patent are hereby corrected as shown below:

Column 3, line 37, change "$R_{16}=-1,229.864$" to --$R_{16}=-1,229.364$--;

line 40, change "$vd_{11}=60.8$" to --$vd_{11}=60.3$--.

Signed and sealed this 28th day of November 1972.

(SEAL)
Attest:

EDWARD M. FLETCHER, JR.
Attesting Officer

ROBERT GOTTSCHALK
Commissioner of Patents